United States Patent [19]

Warner

[11] Patent Number: 5,029,793
[45] Date of Patent: Jul. 9, 1991

[54] CUP IN A VEHICLE

[76] Inventor: Arnold D. Warner, 926 W. Main St., Ionia, Mich. 48846

[21] Appl. No.: 552,768

[22] Filed: Jul. 16, 1990

Related U.S. Application Data

[62] Division of Ser. No. 215,723, Jul. 6, 1988, Pat. No. 4,943,025.

[51] Int. Cl.⁵ .............................................. H47K 5/00
[52] U.S. Cl. ................................. 248/318; 248/238; 248/311.2; 248/310
[58] Field of Search ............... 248/318, 322, 323, 340, 248/328, 311.2, 310, 215, 341, 320, 317

[56] References Cited

U.S. PATENT DOCUMENTS

| | | |
|---|---|---|
| 183,640 | 9/1958 | Van Dusen . |
| 699,189 | 5/1902 | Kerr . |
| 1,606,289 | 11/1926 | Bowers . |
| 2,192,167 | 3/1940 | Bagley et al. . |
| 2,287,473 | 6/1942 | Glines . |
| 2,656,932 | 10/1953 | Carr . |
| 2,936,076 | 5/1960 | Harris . |
| 2,951,167 | 9/1960 | Critcher . |
| 3,042,355 | 7/1962 | Stevens . |
| 3,140,557 | 7/1964 | Albrycht ...................... 248/231 X |
| 3,184,203 | 5/1965 | Steen . |
| 3,226,076 | 12/1965 | Spuhler . |
| 3,228,577 | 1/1966 | Croff ................................ 248/317 |
| 3,269,683 | 8/1966 | Shinaver ........................ 248/318 X |
| 3,288,417 | 11/1966 | Wallace . |
| 3,463,436 | 8/1969 | Foster, Jr. . |
| 3,486,683 | 12/1969 | Kamins et al. ................. 248/340 X |
| 3,486,685 | 12/1969 | Kamins et al. . |
| 3,731,840 | 5/1973 | Beutler et al. ................. 248/340 X |
| 3,761,044 | 9/1973 | Ahmer ............................ 248/311.2 |
| 3,848,277 | 11/1974 | Reguitti . |
| 3,888,439 | 6/1975 | Tuttle . |
| 3,907,118 | 9/1975 | Pelavin .......................... 248/341 X |
| 4,053,131 | 10/1977 | Francis . |
| 4,309,019 | 1/1982 | Bloom . |
| 4,654,274 | 3/1987 | DeMars . |

Primary Examiner—Alvin C. Chin-Shue
Attorney, Agent, or Firm—Price, Heneveld, Cooper, DeWitt & Litton

[57] ABSTRACT

A method for holding a cup in a vehicle so that it can be accessed by a person operating the vehicle in which the cup is suspended from the vehicle mirror or like attachment point. The cup is positioned on a flat base which includes a vertical column extending upwardly therefrom along one edge. A cantilever arm extends outwardly from the vertical column to a point over the central portion of the base and over the cup positioned thereon. A semi-flexible member extends from the cantilever arm upwardly to a hook which hooks over the vehicle mirror or like suspensions point.

9 Claims, 2 Drawing Sheets

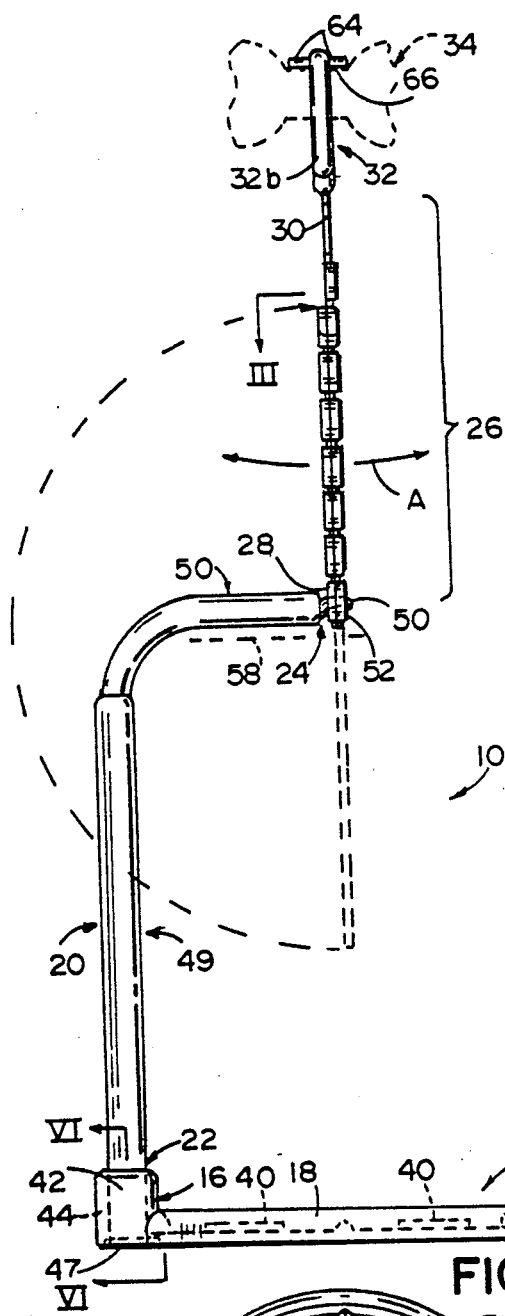
FIG. 2
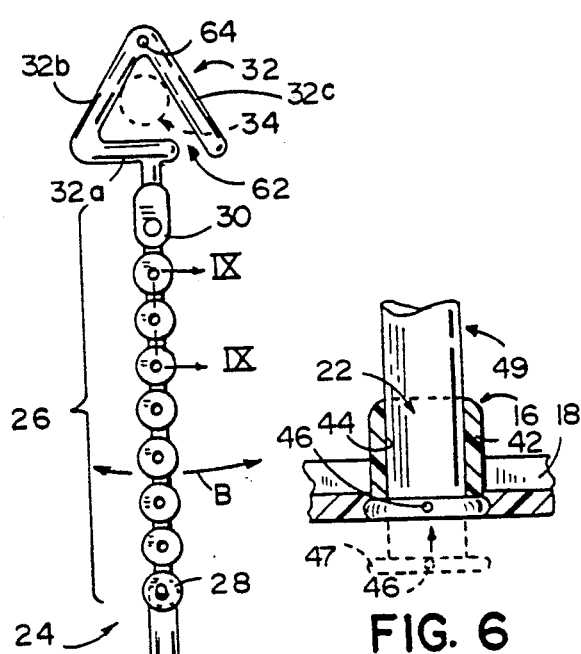
FIG. 5
FIG. 6
FIG. 7
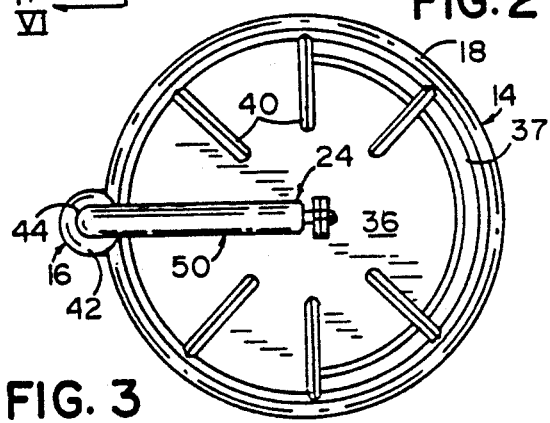
FIG. 3
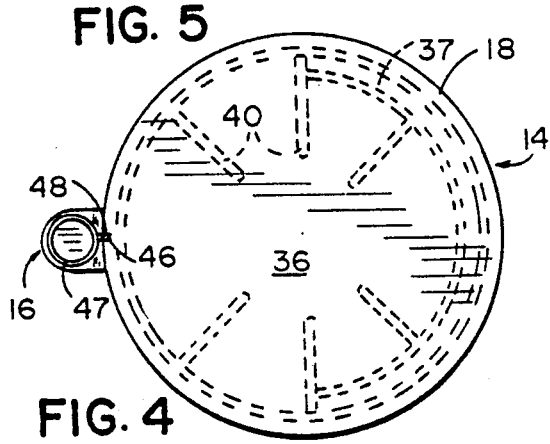
FIG. 4

CUP IN A VEHICLE

This is a division of application Ser. No. 07/215,723, filed July 6, 1988, now U.S. Pat. No. 4,943,025

BACKGROUND OF THE INVENTION

This invention relates generally to an improved device for holding drinks through suspension of the device within a vehicle, such as an automobile and the like. The term cup as used throughout is intended to encompass any beverage holder, as for example cans, glasses, bottles and cups as we normally think of same.

Living in a fast-paced society, it is often desirable to drink a beverage "on the run". For example, one may purchase a cup of coffee at a drive-up window of a "fast food" restaurant, and wish to continue driving while drinking the coffee in the confines of his vehicle It is, of course, inconvenient, as well as dangerous, to simply set the cup on the vehicle seat, or even the dashboard. Various designs have been proposed for securing the cup within the vehicle.

Generally, most vehicle cup holders fit into one of two categories. Either the cup holder comprises a recess within an accessory unit, typically disposed along the vehicle floor between the passengers, or a basket hung along a portion of the vehicle. It should be recognized, that either of these designs has the common feature of being fixed to a portion of the vehicle so that abrupt stops or turns made by the vehicle are likely to cause spilling and splashing of the liquid. One of the more popular designs, in the latter of the two categories mentioned above, employs the concept of hanging a basket which conforms to a cup or the like adjacent to a vehicle door via an upright arm attached to the basket. This design is well-suited for rural driving in which sudden stops and starts, as well as frequent turns, are not often encountered. In the city, however, where such stopping, starting and frequent turning is not uncommon, such movements by the vehicle can result in the jarring of the basket holder by the door itself, resulting in oscillatory wave-like movement of the liquid within the cup. Since the holder is fixed to the door, when the cup contains any substantial amount of liquid, the above-mentioned stops and/or turns will inevitably cause spilling and splashing of the liquid out of the cup.

Also in all of the foregoing designs, there is a relatively deep well or basket into which the cup is seated. Sometimes, a cup or can gets "hung up" in such a retainer when the user tries to remove it. This in itself can cause spills or can cause the holder to become accidentally dislodged from its mount.

SUMMARY OF THE INVENTION

The present invention comprises a method for holding a cup for easy access by the user of a vehicle, by suspending the cup from the vehicle mirror or like suspension point. The method includes providing cup-holding device including a base for supporting a cup, a vertical column connected to an edge of the base, and a cantilever arm extending outwardly from said column to a point disposed above the base approximately over the central portion of the base. Suspension means extend upwardly from the cantilever arm. The base is generally flat with the space above the base being open such that there are no sidewalls or the like to interfere with insertion onto or removal of the cup from the base. When the cup-holding device is suspended from the vehicle mirror with a liquid-filled cup, spilling and splashing from the filled cup due to erratic movements and turns commonly associated with a vehicle are alleviated.

These and other objects and advantages inherent in the present invention will become more readily apparent from the specification and the drawings

BRIEF DESCRIPTION OF THE DRAWINGS

FIG. 2 is a side elevational view of the cup holder;

FIG. 3 is an overhead plan view of the cup holder taken along line III of FIG. 2;

FIG. 4 is a bottom elevational plan view of the cup holder;

FIG. 5 is a fragmentary front elevational view of the cup holder;

FIG. 7 is a fragmentary cross-sectional view of the cup holder taken along line VII—VII of FIG. 5;

DETAILED DESCRIPTION OF THE PREFERRED EMBODIMENTS

Figure 1:
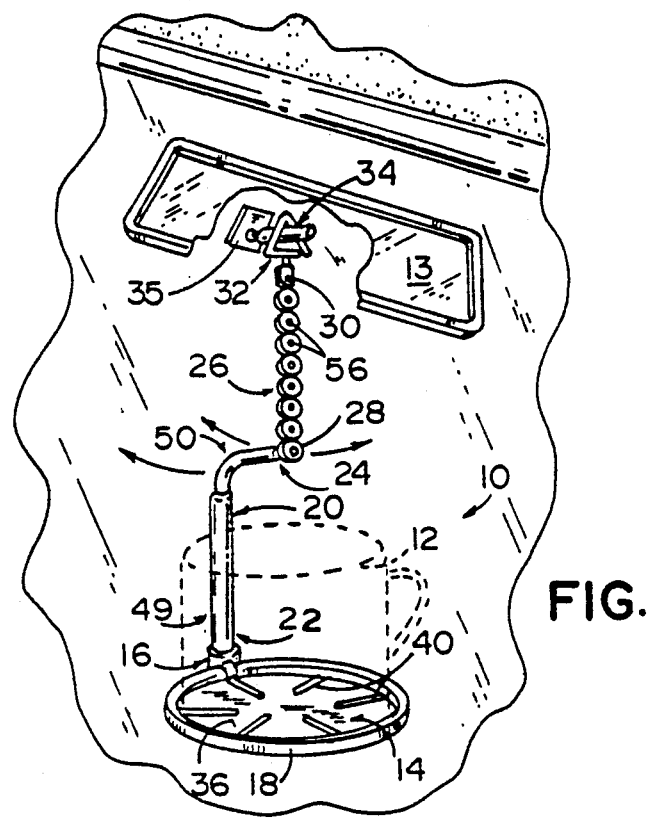
FIG. 1 is a perspective view of a cup holder embodying the present invention suspended from a vehicle mirror, the vehicle mirror being broken away to reveal the hanging arrangement of the suspended cup holder.

For purposes of description herein, the terms "upper," "lower," "right," "left," "rear," "front," "vertical," "horizontal" and derivatives thereof shall relate to the invention as oriented in FIG. 1. However, it is to be understood that the invention may assume various alternative orientations and step sequences, except where expressly specified to the contrary. It is also to be understood that the specific devices and procedures illustrated in the attached drawings, and described in the following specification, are simply exemplary embodiments of the inventive concepts defined in the appended claims. Hence, specific dimensions, and other physical characteristics relating to the embodiments disclosed herein are not to be considered as limiting, unless the claims by their language expressly state otherwise.

Referring to FIG. 1, holder 10 for a cup 12 or the like includes a base 14 for supporting the cup 12. A mounting sleeve 16 is integrally molded with base member 14 along the raised edge 18 thereof. Mounting sleeve 16 receives cantilever support first end 22 of cantilever support 20, holding cantilever support 20 in a substantially upright position relative to base 14. Cantilever support 20 extends upwardly and then out over base 14 to a point where cantilever support second end 24 is disposed approximately over the central portion of base 14. Holder 10 is suspended via a semi-flexible elongate strip 26, having first and second ends 28 and 30. First end 28 of semi-flexible elongate strip 26 is connected to cantilever support second end 24 and semi-flexible elongate strip second end 30 has a hook 32 attached thereto. Holder 10 can be suspended from a vehicle mirror 13 to support cup 12 when it is filled with liquid. Suspension of cup 12 with holder 10 prevents spilling or splashing of liquid from cup 12 due to erratic movements and turns commonly associated with a vehicle.

Holder 10 is typically suspended from vehicle mirror 13 by positioning hook 32 over a mounting assembly 34 which adjustably connects mirror 13 with a vehicle window shield via a channel mount 35. It is, of course, possible to suspend holder 10 to just about any suspended rod available in vehicles, such as automobiles, trucks, buses, boats, and the like. It is only necessary that the suspended rod be stable enough to maintain a substantially horizontal position while suspending holder 10, which typically would support a liquid-filled cup 12 or the like.

In the preferred embodiment, holder 10 is constructed of injection molded plastic materials so that it is lightweight, yet durable. Although holder 10 need not be constructed of plastic per se, it is desirable that it be constructed of material that readily supports liquid filled cup 12 and exerts a minimum amount of force on mounting assembly 34.

In the preferred embodiment, base 14 comprises a circular platform 36 (FIGS. 1-4) to accommodate the familiar circular shape of most cups and cans. A slightly upraised lip 18 surrounds platform 36 to prevent any very abrupt movement from causing cup 12 to slide off platform 36. However, lip 18 is sufficiently short that no well is formed in which cup 12 could "hang up". In the best mode, lip 18 is about 0.2 inches high. As presently contemplated, an additional upraised lip 37 (FIGS. 3 and 4), having an arc of about 180°, is mounted within upraised lip 18. The purpose of including upraised lip 37 is to centrally position cup 12, and to prevent the same from sliding toward the user.

Platform 36 is a thin sheet of plastic, having an upper surface upon which ribs 40 are disposed. In the best mode now contemplated, platform 36 has a diameter of about 3.2 inches. Ribs 40 (FIG. 3) extend radially inward from an outer circumference of circular platform 36. Ribs 40 serve to raise cup 12 just slightly above the upper surface of circular platform 36 to prevent any spilled liquid from sealing cup 12 to circular platform 36. In the preferred embodiment, ribs 40 need not be particularly high relative to the upper surface of circular platform 36, since only a little space needs to be created between the bottom of cup 12 and the upper surface of circular platform 36 to guard against any liquid sealing. Ribs 40 should be low relative to edge 18 since elevating cup 12 substantially over the upper surface of circular platform 36 would destroy the purpose of edge 18, i.e., to secondarily contain cup 12 within base 14.

Sleeve 16, which is used to position cantilever support 20 with respect to base 14 comprises a cylindrical wall 42 defining a channel 44 (FIG. 2). Cylindrical wall 42 is integrally connected to base 14. The diameter of channel 44 is just slightly greater than the diameter of cantilever support 20 such that cantilever support first end 22 is closely received within channel 44. The above-mentioned diameters are, in the best mode, about 0.3 inches. Cantilever support first end 22 is readily self-securing due to the frictional engagement between cylindrical wall 42 and cantilever support first end 22. Additionally, since cantilever support 20 may be slidably released from sleeve 16, and, as explained below, flexible elongate strip 26 may be readily detached from cantilever support second end 24, holder 10 may be easily disassembled and compactly stored when not in use.

Cantilever support first end 22 terminates in an enlarged, circular lip 47 which will not pass through sleeve 16, such that cantilever support first end 22 does not slide out of channel 44 when holder 10 is suspended from mounting assembly 34. To prevent rotation of base 14 about cantilever support 20, a finger 46 (FIG. 4) extends from lip portion 47 (FIG. 6) of cantilever support first end 22 and is received in a complementary slot 48 in the bottom of circular platform 36 (FIGS. 4 and 7). To position cantilever support first end 22 for use, finger 46 is aligned with slot 48 and cantilever support 20 is pulled upward until the same is secured in sleeve 16. When holder 10 is suspended, gravitational forces will maintain finger 46 in slot 48 as lip 47 is urged against cylindrical wall 42.

Figure 6A:
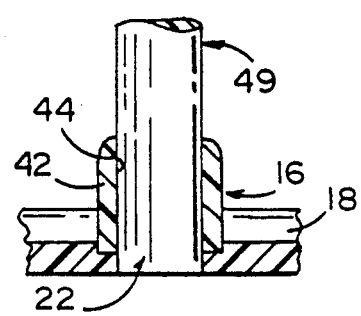
FIG. 6 is a fragmentary cross-sectional view of the cup holder taken along line VI—VI of FIG. 2.

Alternatively, cantilever support first end 22 can be secured within channel 44 without employing the structure including finger 46, lip 47 and slot 48 (FIGS. 4, 6 and 7). For example, as illustrated in FIG. 6a, cantilever support first end 22 may simply be mounted within channel 44 through use of conventional means, such as chemical bonding.

Cantilever support 20, which in the present case is a single piece of injection molded plastic, has a substantially inverted L-shaped configuration. In the best mode, cantilever support 20 will have a length of 5.7 inches. Cantilever support 20 includes a vertical column lower portion 49 and a generally horizontal upper cantilever arm portion 50. By positioning cantilever support second end 24 over the central portion of base 14, the holder is optimally stabilized during suspension.

Cantilever support second end 24 includes a protruding hook 51 (FIG. 8) to which flexible elongate strip 26 is secured. Hook 51 curves upwardly, outwardly and then downwardly from cantilever support second end 24 to define recess 52 for receiving flexible elongate strip 26. The full significance of recess 52 with respect to flexible elongate strip 26 will be discussed in further detail below.

As best illustrated in FIGS. 2 and 5, semi-flexible elongate strip 26 contains a plurality of spaced apertures 56. Each aperture 56 has a diameter that is just slightly less than the cross section of hook 51 at a tapered end thereof such that each aperture 56 fits snugly about a portion of hook 51. Accordingly, each of apertures 56 can be easily pressed over the tapered end of hook 51 (FIG. 9) and seated in recess 52. It is noteworthy that recess 52 not only serves to securely seat one or two apertures 56, but further serves to recess the bottom portion of semi-flexible elongate strip first end 28 away from a plane 58 (FIGS. 2 and 8) generally aligned with the bottom edge of the cantilever support second end portion 24 of cantilever support 20. If flexible strip first end 28 protruded below plane 58, a taller cup 12 or beverage can might catch the bottom portion of strip first end 28 and knock holder 10 loose from its mount on rod 32.

In an alternative embodiment, (FIG. 8a), a finger 51a is molded at an elevated position relative to cantilever support second end 24 to define recess 52. As in the first embodiment, recess 52 insures that the bottom portion of elongate strip first end 28 is raised above plane 58.

In the preferred embodiment, semi-flexible elongate strip 26 is a single piece of stiff, yet pliable plastic. Accordingly, elongate strip 26 is pliable enough to be easily folded, and yet stiff enough to dampen motion of holder 10 during use. Some flexibility is desirable for proper suspension of cup 12 during moivement of the vehicle. A perfectly rigid rod would not be the most preferred embodiment of this invention. Yet complete flexibility would not be most preferred either because one would get less motion dampening.

Figure 8:
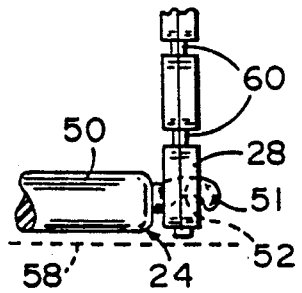
FIG. 8 is a fragmentary side elevational view of an end of a cantilever arm associated with the cup holder connected to a flexible elongate strip.
Figure 8A:
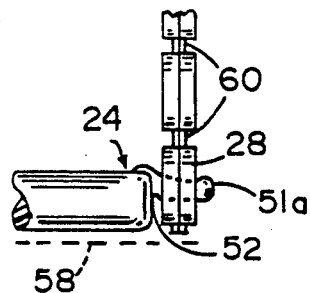
FIG. 8a is an alternative embodiment of the connection arrangement depicted in FIG. 8.
Figure 9:
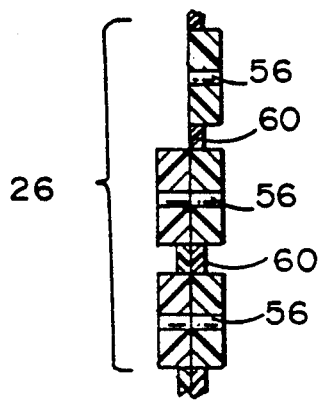
FIG. 9 is a cross-sectional view of the flexible elongate strip taken along line IX—IX of FIG. 5.

As best illustrated in FIGS. 8 and 9, semi-flexible elongate strip 26 includes a plurality of narrowed sections 60 at which elongate strip 26 can be folded upon itself and which give some flexibility to elongate strip 26. By making elongate strip 26 foldable, flexible elongate strip 26 is readily adjustable. That is, the user can choose the aperture 56 corresponding to the desired length of suspension and fold that portion of elongate strip 26 about the appropriate narrowed section 60, if necessary, to obtain a desired length. Due to the construction of semi-flexible elongate strip 26, spilling and splashing is alleviated. That is, elongate strip 26 dampens out much of the vertical oscillation caused by the vehicle during operation.

As illustrated in FIG. 5, apertures 56 are disposed symmetrically along elongate strip 26 so that when semi-flexible elongate strip 26 is folded one or more of apertures 56 is aligned, as in FIG. 9, so that overlapping apertures 56 can be secured over hook 51, as in FIG. 8. The adjustability of flexible elongate strip 26 serves multiple purposes. For example, the height of rearview mirrors among various vehicles varies considerably and it is desirable to achieve different lengths for flexible elongate strip 26 according to the vehicle in which holder 10 is being employed.

Hook 32 (FIGS. 1 and 5), which in the preferred embodiment is integrally connected to elongate strip second end 30, is constructed from a semi-rigid plastic material and is configured to substantially enclose mounting assembly 34. By substantially enclosing mounting assembly 34 with hook 32, it is possible to prevent hook 32 from being inadvertently dislodged from mounting assembly 34. As best illustrated in FIG. 5, hook 32 is sized to closely receive a portion of mounting assembly 34 upon which hook 32 is to be hung. Hook 32 is generally triangular in shape, having a base leg 32a, a second leg 32b and a third leg 32c which is not joined to base by 32a so as to leave a small lower gap 62 therebetween. Although hook 32 is basically rigid, hook 32 can be displaced to the extent that mounting assembly 34 can be comfortably pressed through gap 62. Due to the length of gap 62, which is typically about ¼ inch, it is extremely difficult for hook 32 to slide off mounting assembly 34 without the specific aid of the user.

As is common with suspended apparatuses, such as holder 12, sideways, pendulum-type oscillations tend to occur when hook 32 is suspended on mounting assembly 34. Such oscillations can be particularly distracting to the vehicle user and when the pendulum-type oscillations become too violent, spilling and splashing can occur. To alleviate problems accompanying the sideways oscillations, hook 32 (FIG. 5) is configured so that two spaced portions of the same, i.e., legs 32b and 32c, actually contact mounting assembly 34. By configuring hook 32 to contact mounting assembly 34 in this manner, sideways oscillations designated by line B in FIG. 5, are damped through the two point frictional contact with rod 34. In many respects, front-to-back oscillations, as indicated by line A in FIG. 2, can be as distracting to the vehicle user as the sideways oscillations discussed above. Detents 64 are mounted on hook 32 so that when hook 32 is positioned along a stud 66 of mounting assembly 34, front to back oscillations are considerably damped.

Before using holder 10 it is desirable to adjust flexible elongate strip 26, as in FIG. 2, to accommodate for the type of vehicle in which holder 10 is being used. After properly adjusting the height of holder 10, hook 32 is snapped over mounting assembly 34. When cup 12 is filled with liquid and inserted into base 14, holder 10 will generally remain steadied until the vehicle is brought to an abrupt stop or turned. As the vehicle is brought to an abrupt halt or turned, the holder will oscillate along lines A and B of FIGS. 2 and 5, respectively. Normally cup 12 will be held within base 14 by the weight of cup 12 and/or upraised lip 18. It is of particular significance that as the holder oscillates along lines A and B the liquid surface remains parallel with circular platform 36 due to centrifugal forces so that the possibility of spilling or splashing of liquid is minimized. Since holder 10 is suspended from mounting assembly 34, it is safer to use than other fixed holders. For example, if one should be thrown forward toward the rearview mirror, in the instance of an accident, holder 10 would immediately be pushed away. Despite the snapping arrangement of hook 32 relative to mounting assembly 34, holder 10 is not fixed to mounting assembly 34 and can easily be broken away from the same in case of emergency or accident.

Due to the suspension of the holder, it is shock absorbent, thus aiding in the prevention and spilling of liquid when it is hung on a mounting assembly. Experimentation has indicated that the suspension system of holder 10 is so stable that holder 10 can even be effectively employed on a motorcycle. Having a base with a low-lying upraised edge, rather than a basket, allows for easy access by the user to a cup or beverage container supported by the base. The cup holder is easy to mount and safe for use in just about any type of vehicle. Since the cup holder is lightweight, durable and easy to manufacture, it is well suited for its intended purpose.

In the foregoing description, it will be readily appreciated by those skilled in the art that modifications may be made to the invention without departing from the concepts disclosed herein. Such modifications are to be considered as included in the following claims unless the claims by their language expressly state otherwise.

The embodiments of the invention in which an exclusive property or privilege is claimed are defined as follows:

1. A method for holding a cup in a vehicle comprising:
   providing a generally flat base for supporting a cup, the space above the base being open whereby a cup can be freely moved onto and off the base without interference from sidewalls surrounding the base;
   connecting a vertical column to an edge of the base;
   providing a cantilever arm extending outwardly from the vertical column over the base to a point disposed over the central portion of the base;
   suspending the cantilever arm and therefore the cup-holding device from a semi-flexible member extending from the cantilever arm upwardly to a hook, and hooking said hook over a vehicle mirror.

2. The method of claim 1, further comprising the step of making said semi-flexible member adjustable thereby allowing a height, being defined by the distance between the hook and the point at which the flexible means is connected to the cantilever arm, to be varied.

3. The method of claim 2, which includes providing said semi-flexible member as an elongated strip including a plurality of apertures disposed along a longitudinal axis of said strip, each of said apertures being adapted to snugly fit around an end of said cantilever arm; said method including snugly fitting one of said apertures around said cantilever arm.

4. The method of claim 1, further comprising the step of configuring said hook to substantially surround a mounting assembly typically associated with the vehicle mirror such that the holder cannot be inadvertently dislodged from the mounting assembly.

5. The method of claim 4, further comprising the step of configuring said hook to contact two separate portions of a mounting assembly typically associated with the vehicle mirror such that oscillation from one side to another is damped.

6. The method of claim 5, further comprising the step of:

providing said hook with at least two detents adapted to be seated along a portion of a mounting assembly typically associated with the vehicle mirror such that oscillation from front-to-back is damped.

7. The method of claim 1, further comprising the step of disposing a plurality of ribs along an upper surface of said base to prevent the formation of a liquid seal between a bottom portion of the cup and the base.

8. The method of claim 1, further comprising the step of:

providing a slightly upraised peripheral lip for preventing a cup from sliding off the base, the lip being sufficiently low that it does not interfere with placement or intentional removal of a cup from the base.

9. The method of claim 1, further comprising the step of recessing a bottom portion of said cantiliver arm receiving the semi-flexible member such that a substantial portion of a bottom portion of said flexible member is contained within the recessed portion and does not protrude significantly below the cantilever arm.

* * * * *